(12) United States Patent
Spracklen

(10) Patent No.: US 8,793,439 B2
(45) Date of Patent: Jul. 29, 2014

(54) ACCELERATING MEMORY OPERATIONS USING VIRTUALIZATION INFORMATION

(75) Inventor: Lawrence Spracklen, Boulder Creek, CA (US)

(73) Assignee: Oracle International Corporation, Redwood City, CA (US)

( * ) Notice: Subject to any disclaimer, the term of this patent is extended or adjusted under 35 U.S.C. 154(b) by 618 days.

(21) Appl. No.: 12/726,655

(22) Filed: Mar. 18, 2010

(65) Prior Publication Data

US 2011/0231614 A1  Sep. 22, 2011

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC ........ G06F 12/0815 (2013.01); G06F 12/0817 (2013.01); G06F 12/0831 (2013.01)
USPC ........... 711/141; 711/142; 711/143; 711/144; 711/145; 711/146

(58) Field of Classification Search
CPC ............ G06F 9/45558; G06F 12/0831; G06F 12/0815; G06F 12/0817; G06F 9/45533
See application file for complete search history.

(56) References Cited

U.S. PATENT DOCUMENTS

| | | | |
|---|---|---|---|
| 5,852,716 A * | 12/1998 | Hagersten | 709/201 |
| 7,035,952 B2 * | 4/2006 | Elliott et al. | 710/300 |
| 7,865,893 B1 * | 1/2011 | Omelyanchuk et al. | 718/1 |
| 7,925,842 B2 * | 4/2011 | Arimilli et al. | 711/147 |
| 2002/0129187 A1 | 9/2002 | Nayyar et al. | |
| 2003/0191615 A1 | 10/2003 | Bailey et al. | |
| 2005/0021913 A1 * | 1/2005 | Heller | 711/141 |
| 2008/0028408 A1 * | 1/2008 | Day et al. | 718/104 |
| 2008/0215819 A1 * | 9/2008 | Cantin et al. | 711/141 |
| 2009/0254714 A1 | 10/2009 | Nayyar et al. | |
| 2010/0313201 A1 * | 12/2010 | Warton et al. | 718/1 |

OTHER PUBLICATIONS

Preliminary Report on Patentability for International Application No. PCT/US2011/028327 mailed Sep. 27, 2012 (5 pages).

* cited by examiner

*Primary Examiner* — Yaima Rigol
(74) *Attorney, Agent, or Firm* — Osha Liang LLP

(57) ABSTRACT

A method of accelerating memory operations using virtualization information includes executing a hypervisor on hardware resources of a computing system. A plurality of domains are created under the control of the hypervisor. Each domain is allocated memory resources that include accessible memory space that is exclusively accessible by that domain. Each domain is allocated one or more processor resources. The hypervisor identifies domain layout information that includes a boundary of accessible memory space of each domain. The hypervisor provides the domain layout information to each processor resource. Each processor resource is configured to implement, on a per domain basis, a restricted coherency protocol based on the domain layout information. The restricted coherency protocol bypasses, relative to the domain, downstream caches when a cache line falls within the accessible memory space of that domain.

16 Claims, 4 Drawing Sheets

ACCELERATING MEMORY OPERATIONS USING VIRTUALIZATION INFORMATION

BACKGROUND OF INVENTION

The hierarchical organization of memory within a computing system improves the performance of memory operations by utilizing on-chip cache memories to bypass high latency off-chip system memory accesses. Cache coherency protocols ensure that the integrity of the data within the hierarchical organization of memory of a given system is maintained. The performance of memory operations is impacted by cache coherency considerations.

SUMMARY OF INVENTION

According to one aspect of one or more embodiments of the present invention, a method of accelerating memory operations using virtualization information includes executing a hypervisor on hardware resources of a computing system. A plurality of domains are created under the control of the hypervisor. Each domain is allocated memory resources that include accessible memory space that is exclusively accessible by that domain. Each domain is allocated one or more processor resources. The hypervisor identifies domain layout information that includes a boundary of accessible memory space of each domain. The hypervisor provides the domain layout information to each processor resource. Each processor resource is configured to implement, on a per domain basis, a restricted coherency protocol based on the domain layout information. The restricted coherency protocol bypasses, relative to the domain, downstream caches when a cache line falls within the accessible memory space of that domain.

According to one aspect of one or more embodiments of the present invention, a system includes a processor, a system memory, a network device, an input device, and an output device. The processor executes instructions that accelerate memory operations using virtualization information that includes executing a hypervisor on hardware resources of a computing system. A plurality of domains are created under the control of the hypervisor. Each domain is allocated memory resources that include accessible memory space that is exclusively accessible by that domain. Each domain is allocated one or more processor resources. The hypervisor identifies domain layout information that includes a boundary of accessible memory space of each domain. The hypervisor provides the domain layout information to each processor resource. Each processor resource is configured to implement, on a per domain basis, a restricted coherency protocol based on the domain layout information. The restricted coherency protocol bypasses, relative to the domain, downstream caches when a cache line falls within the accessible memory space of that domain.

Other aspects of the present invention will be apparent from the following description and the appended claims.

DETAILED DESCRIPTION

Figure 1:
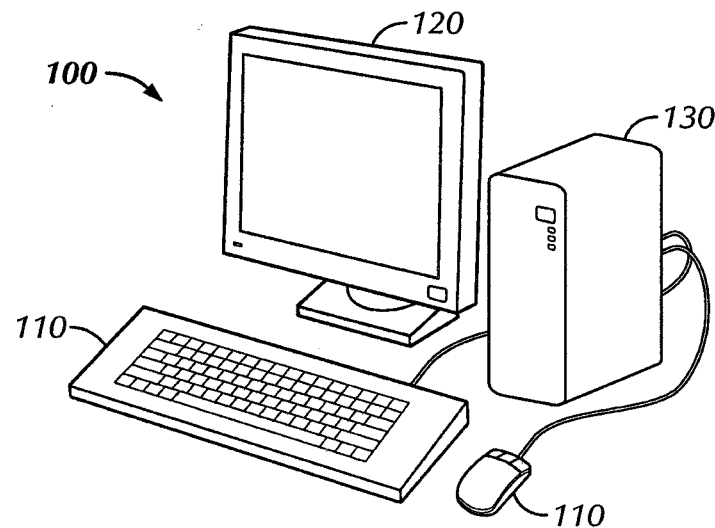
FIG. 1 shows a computing system in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

FIG. 1 shows a computing system in accordance with one or more embodiments of the present invention. A computing system 100 includes an input device 110, an output device 120, and a mechanical chassis 130. The mechanical chassis 130 includes one or more printed circuit boards ("PCB"), a network device, and a storage device (not shown). In one or more embodiments of the present invention, the computing system 100 is a server, a workstation, a desktop computer, or a mobile computer. One of ordinary skill in the art will recognize the computing system could be any processor-based computing device.

Figure 2:
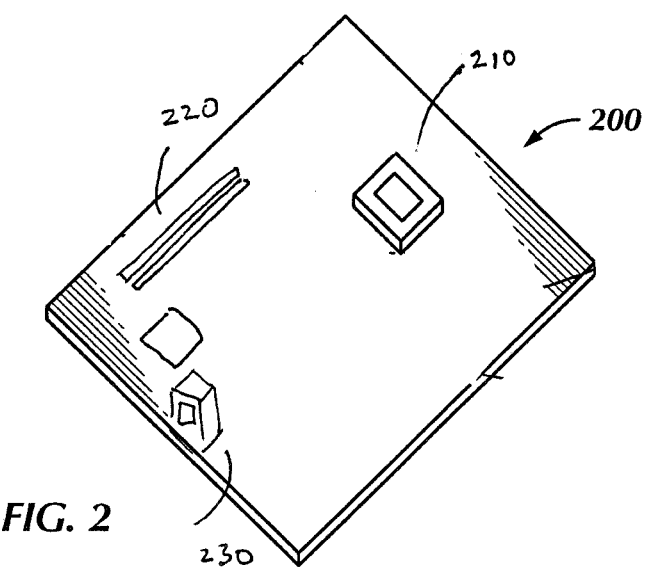
FIG. 2 shows a printed circuit board of the computing system in accordance with one or more embodiments of the present invention.

FIG. 2 shows a printed circuit board of the computing system in accordance with one or more embodiments of the present invention. A PCB 200 includes one or more processors 210, a system memory 220, and a network device 230. In one or more embodiments of the present invention the network device 230 supports the Ethernet standard. One of ordinary skill in the art will recognize that the one or more processors 210, the system memory 220, and the network device 230 may be disposed on any combination of one or more PCBs 200 as part of the computing system 100.

Figure 3:
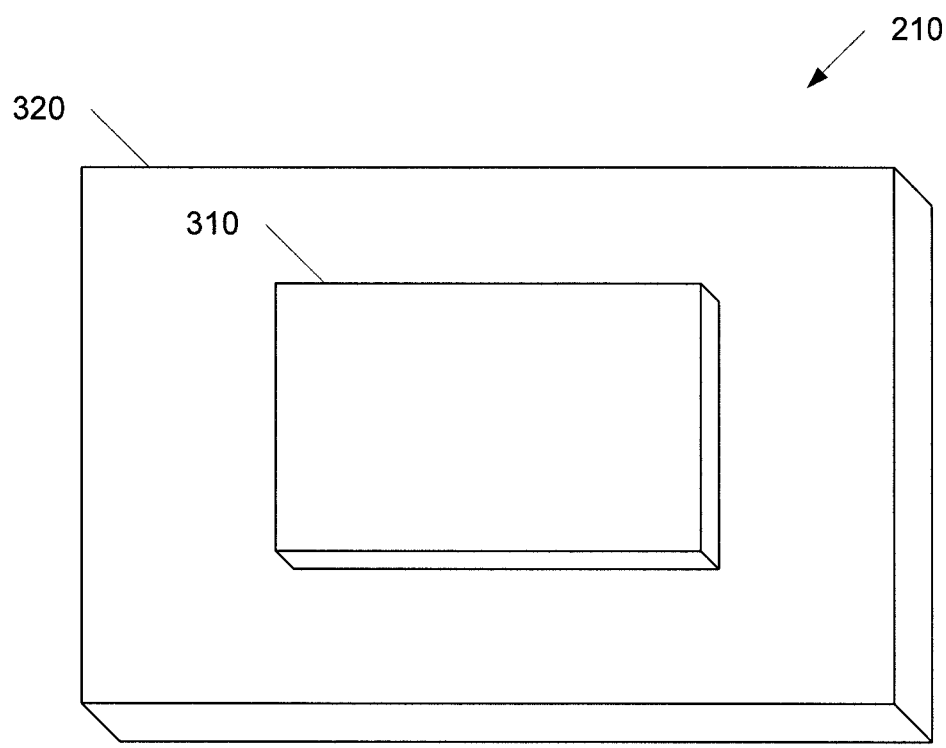
FIG. 3 shows a processor of the computing system in accordance with one or more embodiments of the present invention.

FIG. 3 shows a processor of the computing system in accordance with one or more embodiments of the present invention. Each processor 210 includes one or more die 310 disposed on a substrate 320. Each die 310 includes one or more processing cores. Each processing core includes one or more on-chip cache as part of a hierarchical organization of memory within the computing system 100. The on-chip cache may store instructions, data, or a combination of instructions and data. One of ordinary skill in the art will recognize that the use of on-chip cache can accelerate memory operations.

A processor 210 that consists of a single processing core is referred to as a single-core processor. A single-core processor includes a private first level cache ("L1$") and a private second level cache ("L2$"). In this instance, the L1$ and L2$ are private because they are for the exclusive use of the single-core processor. The caches are named in order of proximity to the core. In this instance, the cache closest to the core is designated the L1$. If the computing system 100 includes a plurality of single-core processors that share the system memory 220, additional hardware may be implemented within the computing system 100 to ensure coherency of the caches of each single-core processor and the system memory 220. This additional hardware may include a shared coherency hub or directory that is shared by the plurality of single-core processors. With respect to a single-core processor of the plurality of single-core processors, all caches other than its own private L1$ and private L2$ are considered downstream caches.

A processor that consists of multiple processing cores is referred to as a multi-core processor. In a multi-core processor, each core includes a private L1$, a private L2$, and a third level cache ("L3$") that is shared by all the processing cores that comprise the multi-core processor. In this instance, the L3$ is considered shared because it is shared by all the cores that comprise the multi-core processor. If the computing system 100 includes a plurality of multi-core processors that share the system memory 220, additional hardware may be implemented within the computing system 100 to ensure coherency of the caches of each processor and the system memory 220. This additional hardware may include a shared coherency hub or directory that is shared by the plurality of multi-core processors. With respect to a core of the multi-core processor, all caches other than its own private L1$ and private L2$ are considered downstream caches. One of ordinary skill in the art will recognize that, while the cache configuration of a multi-core processor may vary, a downstream cache is any shared cache or private cache of another core or processor.

Full-system cache coherency protocols maintain consistency between all caches and shared memory resources within the computing system. For purposes of illustration only, in an exemplary cache coherency protocol, the state of each cache line is designated as Modified, Owned, Exclusive, Shared, or Invalid. A cache line designated as Modified indicates that the cache line holds the correct version of the data, that the data stored in system memory is stale, and that no other core/processor holds a copy. A Modified cache line is sometimes referred to as dirty, indicating that is contains data that has been modified from that stored in the system memory. A cache line designated as Owned indicates that the cache line holds the correct version of the data, that the data stored in system memory may be stale, and that other cores/processors may hold a copy of the data if their cache line is designated as Shared. However, only one core/processor can hold the data in a cache line designated as Owned. A cache line designated as Exclusive indicates that the cache line holds the correct version of the data, that the data stored in system memory is the correct version of the data, and that no other core/processor holds a copy of the data. An Exclusive cache line is sometimes referred to as clean, indicating that the cache line contains data that matches that stored in the system memory. A cache line designated as Shared indicates that the cache line holds the correct version of the data, that the data stored in system memory is the correct version when no other core/processor holds the data in the Owned state, and that other cores/processors may hold a copy of the data if their cache line is designated as Shared. A cache line designated as Invalid indicates that the data stored in the cache line is not a valid and correct version of the data.

Virtualization technologies create one or more private execution environments within the computing system. Virtualization can be implemented as operating system ("OS") virtualization or virtual machine virtualization. In OS virtualization, the OS creates a plurality of private execution environments within a single instance of the OS. Each of the private execution environments is controlled by the OS and is independent of the hardware layer. In virtual machine virtualization, a virtual machine monitor, or hypervisor, runs one or more virtual machines, also known as domains, each of which can run a different OS, simultaneously on a single computing system.

Figure 4:
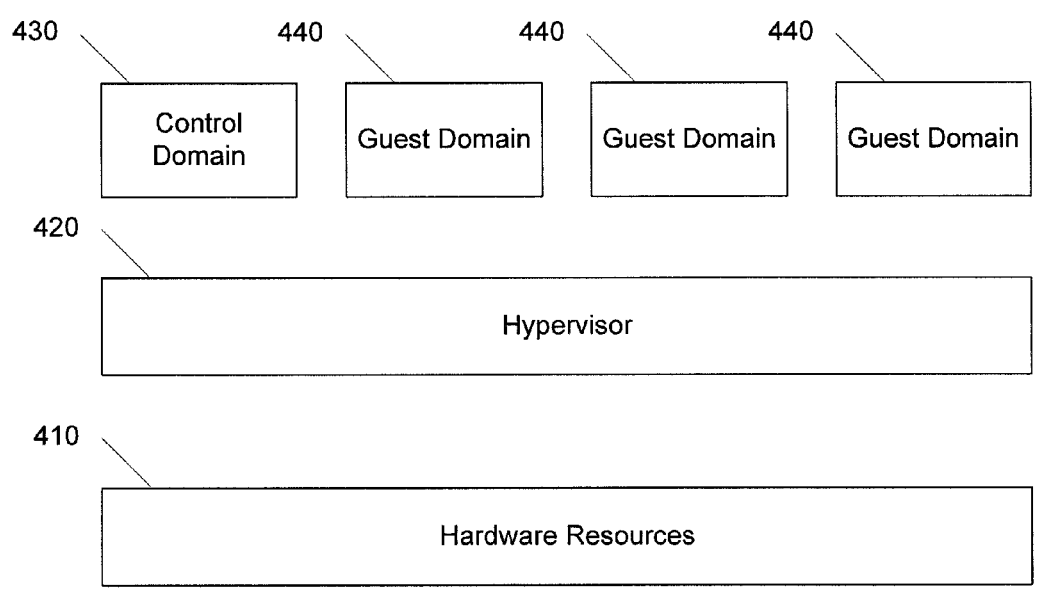
FIG. 4 shows a hypervisor architecture in accordance with one or more embodiments of the present invention.

FIG. 4 shows a hypervisor architecture in accordance with one or more embodiments of the present invention. A computing system 100 includes hardware resources 410, a hypervisor 420, a control domain 430, and one or more guest domains 440. The hardware resources 410 include one or more processors 210, system memory 220, and input/output resources ("IO") 110 and 120. The hypervisor 420 is a software layer that runs directly on the hardware resources 410. In one or more embodiments of the present invention, the control domain 430 runs a full instance of an OS and each guest domain 440 runs a full instance of an OS that may be different from the OS run on the control domain 430 or the other guest domains 440. The hypervisor 420 partitions, shares, manages, and monitors the hardware resources 410 and acts as an interface between the hardware resources 410 and the domains. As such, the hypervisor 420 performs the low-level operations required to provide a virtualized platform, i.e., the foundational aspects of the virtualized platform. The control domain 430 performs all other tasks. For example, the control domain 430 determines which guest domains 440 are created, which resources each guest domain 440 can access, and how much memory is allocated to each guest domain 440.

The hypervisor 420 includes a scheduler that schedules domains onto processors. Each domain, including the control domain 430, includes a set of virtual processors that it owns and does not share with other domains. Each virtual processor can be scheduled onto a running, blocked, or runable core or processor. When the control domain 430 is booted, the hypervisor 420 retains a small amount of memory and assigns the remainder to the control domain 430. When the control domain 430 creates a guest domain 440, it instructs the hypervisor 420 to take memory from the control domain 430 and reassign that memory to the guest domain 440.

In one or more embodiments of the present invention, the hypervisor architecture can be implemented as a paravirtualized environment or a fully virtualized environment. In a paravirtualized environment, each instance of the OS is aware of the virtualization layer and the OS works closely with the hypervisor 420 to achieve improved performance. In a fully virtualized environment, each instance of the OS is unaware that it is running in a virtualized environment. While the present invention is described in an exemplary fully virtualized environment, one of ordinary skill in the art will recognize that the restricted coherency optimization could be implemented in a paravirtualized environment in accordance with the present invention.

Notwithstanding the benefit of the hierarchical organization of memory within a computing system, cache coherency considerations can negatively impact the performance of memory operations. In a computing system that includes a plurality of processors, when there is a cache miss or a cache line is upgraded from the Shared state to the Owned state, it is necessary to determine whether any other processor in the system owns the line or has a copy of the line within a private cache. While the conventional art discloses a variety of techniques used to accomplish this determination, these techniques are costly in terms of cycle time necessary to either broadcast the query to the other processors in the system or some off-chip coherency hub or directory which may itself require additional queries. As such, the latency of memory operations of multi-processor systems can increase significantly from that observed on single-processor systems, especially as the number of processors increases.

Similarly, a latency issue exists in multi-core processor implementations. Again, the request has to be communicated to some unit which has global visibility into the state of the various on-chip caches in order to ensure that the required data is not present in another core's private cache. As the core count increases, this requirement is onerous and tends to constrain viable cache topologies.

In one or more embodiments of the present invention, a restricted coherency optimization method accelerates memory operations using virtualization information. In one or more embodiments of the present invention, the processor 210 and/or system 100 is fully virtualized into a number of independent domains: one control domain 430 and one or more guest domains 440. These domains are under the control of the hypervisor 420. Each domain can run an independent OS and one or more independent applications. The memory accessed by each domain is, in essence, completely separate from the memory addressed by other domains in the processor or system. As such, the hypervisor 420 knows, with absolute certainty, the boundaries at which coherency must be enforced within a system.

For example, if domain0 runs on processor 0 and domain1 runs on processor1, when domain0 performs a memory operation, it is not possible for processor0 to possess a copy of any line which falls within the address space of domain1. As a result, when processor0 performs a memory operation that misses in the processors on-chip caches, or requires a line to be upgraded, there is no requirement to check if processor1 has the line. As a result, lines can be immediately upgraded to the Owned state, or data can be directly fetched from system memory, without waiting for remote confirmation. Thus, in many instances, the memory latencies, even on large multi-processor systems, can be reduced to that observed on single-processor systems.

To implement this approach, the hypervisor 420 must provide each processor 210 with domain layout information. This domain layout information includes the boundary of the accessible memory space for each domain. In the absence of providing this information, each processor 210 will revert to the conventional full-system cache coherency mode of operation. When each domain is created, the hypervisor 420 will provide information on the layout of each domain to the hardware resources 410, such that the hardware resources 410 can begin to accelerate memory operations as appropriate. The hardware support is flexible and can support various configurations including a domain that spans a single hardware thread, a single core, multiple cores, and potentially multiple processors.

The information required by the hardware resources 410 to undertake the restricted coherency optimizations can be retained at different levels of the memory hierarchy, depending on the exact domain placement and cache topology implemented. As a result, specific domain configurations an implementer wishes to accelerate will dictate which cache levels and memory control units need to be enhanced to provide this support.

If a domain consists of a single hardware thread, the core itself can tag all memory requests from that hardware thread as operations which can benefit from the restricted coherency optimization. As the request propagates through the memory hierarchy, the operation can be accelerated accordingly. For example, for a store that hits in the on-chip caches, the line can immediately be upgraded to the Modified state, without any requirement to propagate the information off-chip. For an off-chip request, the line can be sourced directly from the local memory without the requirement to inform or check any other processors or off-chip directories in the system. In one or more embodiments of the present invention, this mechanism is implemented in hardware with a per-core hyperprivileged register in which each bit indicates whether the corresponding hardware thread in the core is configured as a single-thread domain. For each memory request, the core's load-store unit can tag the request with the appropriate bit from the hyperprivileged register to inform downstream caches if the request originates from a single-thread domain and can be accelerated.

If a domain consists of a single core, the core's closes private cache can tag requests to inform downstream caches that the request comes from a single core domain and can be accelerated. In one or more embodiments of the present invention, this can be achieved by providing a mechanism, e.g., a special store, via which the virtual machine monitor can set a hyperprivileged register in the cache to indicate that its core is operating as a single-core domain.

If a domain spans multiple cores on the same processor, the closest shared cache that handles all of the cores assigned to the domain can tag requests to inform downstream caches that the request comes from a domain that can be accelerated. In this case, each bank of the cache can be enhanced to support a hyperprivileged register in which each bit indicates whether requests from the corresponding core should be handled with the restricted coherency optimization.

If a domain spans multiple processors, depending on the specific system design, it may be possible to enhance coherence hubs to limit the extent to which coherency operations propagate throughout the system. The virtual machine monitor configures the coherency hubs in a similar manner to cache configuration.

It is noted that certain domain configurations may perform worse than others. For example, if a domain is only using a fraction of the hardware threads available on a given core, it may be preferable to leave the remaining threads unused, such that the core can be configured as a single domain.

Figure 5:
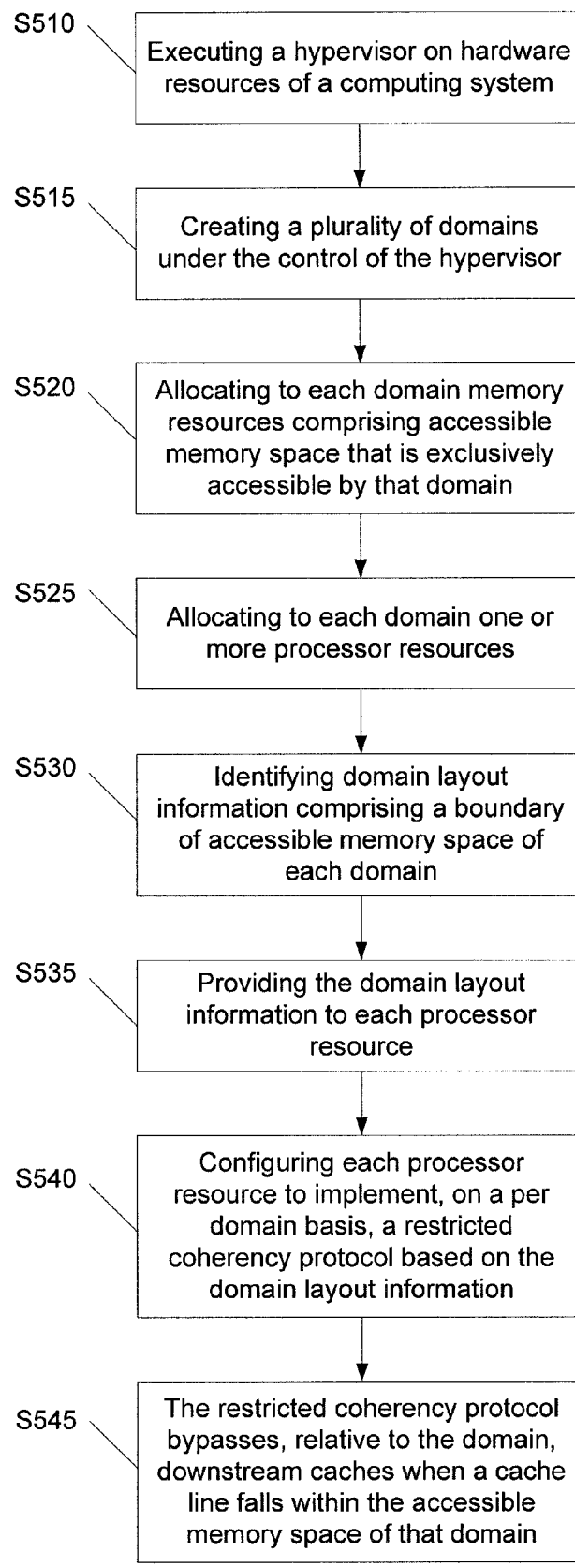
FIG. 5 shows a method of accelerating memory operations using virtualization information in accordance with one or more embodiments of the present invention.

FIG. 5 shows a method of accelerating memory operations using virtualization information in accordance with one or more embodiments of the present invention. In Step S510, a hypervisor is executed on hardware resources of a computing system. In Step S515, a plurality of domains are created under the control of the hypervisor. In one or more embodiments of the present invention, the hypervisor creates a control domain. The control domain, in conjunction with the hypervisor, creates one or more guest domains. The hypervisor serves as the interface between the hardware resources and the domains.

In Step S520, each domain is allocated memory resources that include accessible memory space that is exclusively accessible by that domain. In one or more embodiments of the present invention, the hypervisor retains a small amount of memory for its usage and assigns the remainder of the memory to the control domain. When the control domain creates a guest domain, the control domain instructs the hypervisor to take memory from the control domain and reassign it to the guest domain. The memory assigned to each domain is for the exclusive use of that domain. In Step S525, each domain is allocated one or more processor resources. In one or more embodiments of the present invention, each processor resource may be a hardware resource, i.e., a single-core processor, a core of a multi-core processor, or a multi-core processor, or each processor resource may be a virtualized processor resource comprised of any combination of hardware processor resources.

In Step S530, the hypervisor identifies domain layout information that includes a boundary of accessible memory space for each domain. As such, the hypervisor knows, with absolute certainty, the boundaries at which coherency must be enforced within a system. In Step S535, the hypervisor provides the domain layout information to each processor resource. In Step S540, the hypervisor configures each processor resource to implement, on a per domain basis, a restricted coherency protocol based on the domain layout information. In one or more embodiments of the present invention, the hypervisor configures each processor resource through a hyperprivileged register. The configuration of each processor resource will vary, as noted above, depending on whether the processor resource for a given domain consists of a single hardware thread, a single core, multiple cores on the same processor, or multiple processors.

In Step S545, the restricted coherency protocol bypasses, relative to the domain, downstream caches when a cache line falls within the accessible memory space of that domain. Put another way, the computing system will, by default, implement a full-system cache coherency protocol. When possible, the hypervisor will configure to processor resources to implement the restricted coherency protocol on a per domain basis based on the domain layout information. For a given domain, the restricted coherency protocol will bypass all interactions with downstream caches when a cache line falls within the accessible memory space of that domain. As such, there is no need to query downstream caches, and cache line status can be changed without concern for downstream caches.

While domains can exist for long periods of time, they are not permanent. Domains can be added, removed, resized, or moved. When such an event occurs, if the hardware is exploiting restricted coherency optimizations based on the domain layout, it will be necessary for the virtual machine monitor to inform the hardware about the changes. Further, if, for example, a domain is moved from core0 to core1, it is possible that the caches associated with core0 could potentially contain data pertaining to the domain. As a result, the caches associated with core0 must be flushed prior to re-establishing the restricted coherency optimization for core1. While flushing caches can have a detrimental impact on performance, domains are moved infrequently.

While the previous examples have, for sake of simplicity, assumed there was no communication between domains, such communications can occur. Such communications are heavily policed by the virtual machine monitor and follow established protocols. In some situations, this communication includes a simple copy of data from one domain's address space into another. In other situations, the virtual machine monitor may establish a shared address space that can be accessed by two or more domains. In these situations, there are several options for implementing restricted coherency optimizations.

In a first option, the various caches involved in the restricted coherency optimization are configured to support address-range filtering, such that the hardware is configured to force certain ranges of address to be subject to full coherency, while the vast majority of accesses remain able to benefit from restrict coherency optimizations. The virtual machine monitor would provide the hardware resources the appropriate address filtering ranges before the shared page was undertaken. The viability of this approach is governed by the number of simultaneous address ranges the hardware needs to support to be effective.

In a second option, the domain layout information could be updated to view the communicating domain as a single domain for which inter-thread coherency must be maintained. For example, consider the situation where there is domain0 on core 0 and domain1 on core1. Initially, each core's private cache will be responsible for tagging requests when they are participating in the restricted coherency optimization. When the domains begin to communicate, the private caches can no longer perform this tagging function. At that point, the shared cache will tag requests. As a request, when the virtual machine monitor is initially configuring the inter-domain communication channel, it is necessary for the virtual machine monitor to update the domain placement information to ensure that coherency is maintained between the two communicating domains, but still does not require involving the unnecessary remaining parts of the system.

In a third option, the simplest solution is to disable the restricted coherency optimization for the communicating domains. The restricted coherency optimizations could be enabled once the communications between the domains are no longer required.

Advantages of one or more embodiments of the present invention may include one or more of the following.

In one or more embodiments of the present invention, memory operations are accelerated using virtualization information.

In one or more embodiments of the present invention, the restricted coherency optimization utilizes virtualization information to reduce latencies on multi-processor systems to that of single-processor systems.

In one or more embodiments of the present invention, the restricted coherency optimization utilizes virtualization information to modify a conventional full-system cache coherency protocol to bypass downstream caches when the domain layout information for a given domain excludes the possibility of a cache hit in downstream caches.

In one or more embodiments of the present invention, the restricted coherency optimization can be implemented at different levels of the memory hierarchy, depending on the domain layout and cache topology.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of accelerating memory operations using virtualization information comprising:
    executing a hypervisor on hardware resources of a computing system;
    creating a plurality of domains under the control of the hypervisor;
    allocating to each domain memory resources comprising accessible memory space that is exclusively accessible by that domain;
    allocating to each domain one or more processor resources;
    identifying domain layout information comprising a boundary of accessible memory space of each domain;
    providing the domain layout information to each processor resource;
    configuring, by the hypervisor, each processor resource through a hyperprivileged register; and
    configuring each processor resource to implement, on a per domain basis, a restricted coherency protocol based on the domain layout information,
    wherein the restricted coherency protocol bypasses, relative to the domain, downstream caches when a cache line falls within the accessible memory space of that domain, and
    wherein the hyperprivileged register configures the coherency regions based upon whether the processor resource of the domain consists of a single hardware thread, a single core, multiple cores, or multiple processors.

2. The method of claim 1, wherein the plurality of domains consists of a control domain and one or more guest domains.

3. The method of claim 1, wherein the restricted coherency protocol restricts a conventional full-system cache coherency protocol using virtualization information.

4. The method of claim 1, wherein each processor resource reverts to a full-system cache coherency protocol in the absence or corruption of the domain layout information.

5. The method of claim 1, wherein the memory resources are virtualized.

6. The method of claim 1, wherein the processor resources are virtualized.

7. The method of claim 1, wherein the domains are fully virtualized.

8. The method of claim 1, wherein the domains are paravirtualized.

9. A system comprising:
- a processor;
- a system memory;
- a network device;
- an input device; and
- an output device,
- wherein the processor executes instructions that accelerate memory operations using virtualization information comprising:
  - executing a hypervisor on hardware resources of a computing system;
  - creating a plurality of domains under the control of the hypervisor;
  - allocating to each domain memory resources comprising accessible memory space that is exclusively accessible by that domain;
  - allocating to each domain one or more processor resources;
  - identifying domain layout information comprising a boundary of accessible memory space of each domain;
  - providing the domain layout information to each processor resource;
  - configuring, by the hypervisor, each processor resource through a hyperprivileged register;
  - configuring each processor resource to implement, on a per domain basis, a restricted coherency protocol based on the domain layout information;
  - wherein the restricted coherency protocol bypasses, relative to the domain, downstream caches when a cache line falls within the accessible memory space of that domain, and
  - wherein the hyperprivileged register configures the coherency regions based upon whether the processor resource of the domain consists of a single hardware thread, a single core, multiple cores, or multiple processors.

10. The system of claim 9, wherein the plurality of domains consists of a control domain and one or more guest domains.

11. The system of claim 9, wherein the restricted coherency protocol restricts a conventional full-system cache coherency protocol using virtualization information.

12. The system of claim 9, wherein each processor resource reverts to a full-system cache coherency protocol in the absence or corruption of the domain layout information.

13. The system of claim 9, wherein the memory resources are virtualized.

14. The system of claim 9, wherein the processor resources are virtualized.

15. The system of claim 9, wherein the domains are fully virtualized.

16. The system of claim 9, wherein the domains are paravirtualized.

* * * * *